(12) United States Patent
Amaike et al.

(10) Patent No.: US 6,250,162 B1
(45) Date of Patent: Jun. 26, 2001

(54) ULTRASONIC SENSOR

(75) Inventors: Shinji Amaike; Junshi Ota, both of Ishikawa (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 09/288,451

(22) Filed: Apr. 8, 1999

(30) Foreign Application Priority Data

Apr. 24, 1998 (JP) .................................................. 10-131347

(51) Int. Cl.[7] ........................................................ G01S 7/52
(52) U.S. Cl. .............................................. 73/642; 310/334
(58) Field of Search ...................... 73/632, 642; 367/163, 367/165, 180; 310/322, 334, 324, 335

(56) References Cited

U.S. PATENT DOCUMENTS 4,437,032 * 3/1984 Glehard ................................ 310/324
5,446,332 * 8/1995 Rapps et al. ......................... 310/334

FOREIGN PATENT DOCUMENTS 9284896   10/1997  (JP) .

* cited by examiner

*Primary Examiner*—John E. Chapman
(74) *Attorney, Agent, or Firm*—Ostrolenk, Faber, Gerb & Soffen LLP (57) ABSTRACT

An ultrasonic sensor includes a case member and a piezoelectric element. The case member has a hollow therein and a bottom portion provided at one end of the hollow. The bottom portion has a thick portion which extends along a first direction and a pair of thin portions which have a smaller thickness than the thick portion and are provided on opposite sides of the bottom portion along a second direction. The piezoelectric element radiates and/or detects ultrasonic energy and is provided at a center of the thick portion on an inner surface of the bottom portion.

8 Claims, 13 Drawing Sheets

ULTRASONIC SENSOR

BACKGROUND OF THE INVENTION

1. Field of the Invention

The present invention relates to an ultrasonic sensor for radiating and/or detecting ultrasonic energy, and more particularly to an ultrasonic sensor to detect the existence of objects or to measure a distance to an object, used as, for example, an obstacle detecting sensor, a vehicle back sonar or corner sonar, etc.

2. Description of the Related Art

Figure 1:
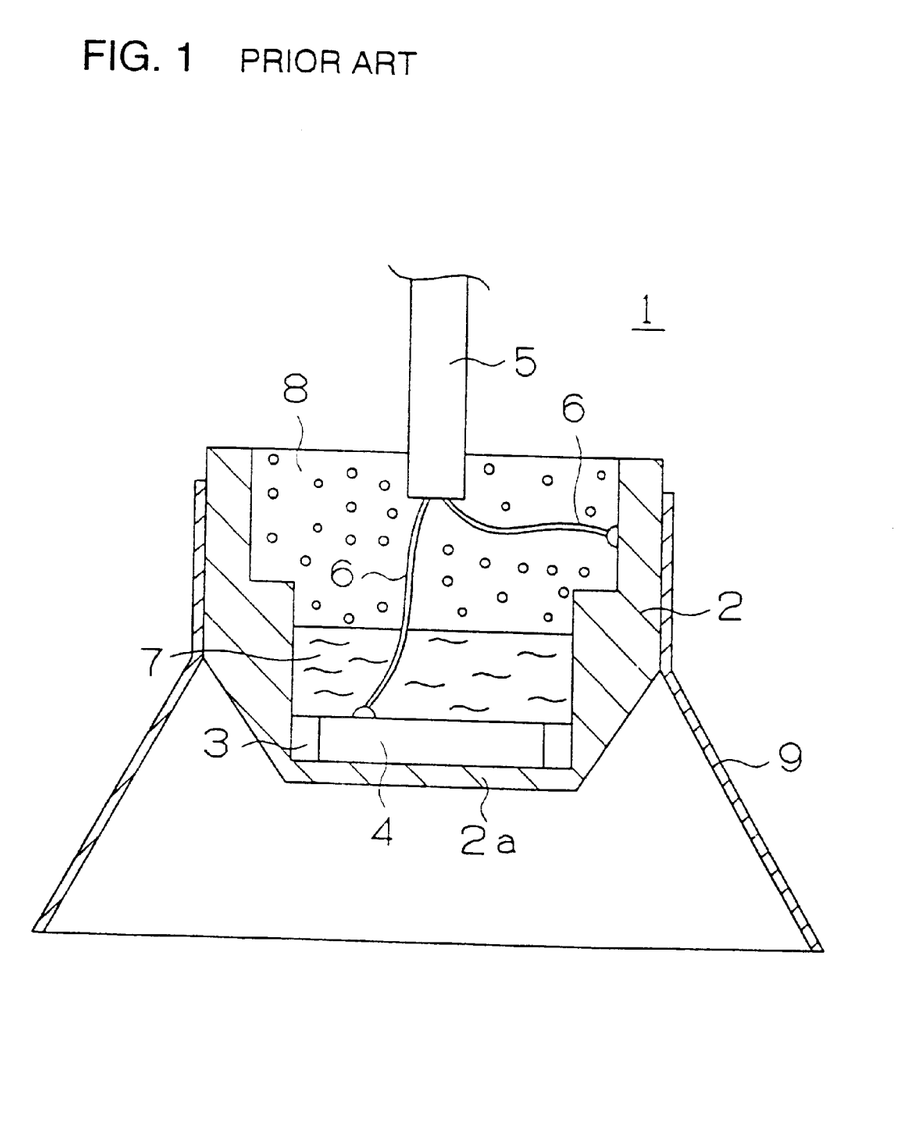
FIG. 1 is a sectional view of the structure of a conventional ultrasonic sensor.

There has been known an ultrasonic sensor which radiates (or transmits) ultrasonic pulses intermittingly and detects (or receives) the ultrasonic pulses reflected by an object, thereby detecting the existence of the object or measuring the distance to the object. FIG. 1 shows a conventional ultrasonic sensor used in vehicles as a back sonar or a corner sonar. The ultrasonic sensor 1 comprises a metallic case member 2. The case member 2 has a hollow having a circular cross section, thereby forming a circular cylindrical shape. A flat piezoelectric element 4, accommodated in the hollow 3, is affixed to the inside surface of a bottom portion 2a of the case member 2. one of the signal wires 6 of a connector cable 5 is connected to one of the electrodes of the piezoelectric element 4, while the other signal wire 6 is in electrical conduction with the other of the electrodes of the piezoelectric element 4, through the case member 2. A soundabsorbing material 7 such as felt covers the piezoelectric element 4, and an insulating resin 8 such as silicone rubber or urethane rubber seals the piezoelectric element 4 and the sound-absorbing material 7.

Such ultrasonic sensors are mounted to, for example, an automobile bumper (not shown) to be used as back sonars or corner sonars for obstacle detection. When the ultrasonic sensor is being mounted to the bumper, the bottom portion of the case member to which the piezoelectric element 4 is affixed, is set substantially perpendicular to the surface of roads or the ground, so as to be positioned to face a direction from which ultrasonic energy is radiated. In such ultrasonic sensors, when the ultrasonic radiation range and the detection range in the horizontal direction is too narrow, a dead angle occurs in the detecting range, whereas when the ultrasonic radiation range and the detection range in the vertical direction is too wide, the reflected ultrasonics from the ground become too noisy. Therefore, in the above-described ultrasonic sensor 1, an ultrasonic horn 9 is mounted to the outer side of the case member 2 from outside the case member 2 in order to control the ultrasonic wave radiation and detection range such that the ultrasonic radiation and detection range is wide in the horizontal direction and narrow in the vertical direction.

However, when the directional properties of ultrasonic sensors are controlled by mounting an ultrasonic horn thereto, rain water and mud (splashed from the road by tires of vehicles), dust, or the like, may accumulate and get clogged in the ultrasonic horn, resulting in malfunctioning of the ultrasonic sensor. In addition, when the ultrasonic horn gets deformed, the directional properties of the ultrasonic sensor change. Further, the use of ultrasonic horns results in large ultrasonic sensors.

Figure 2A:
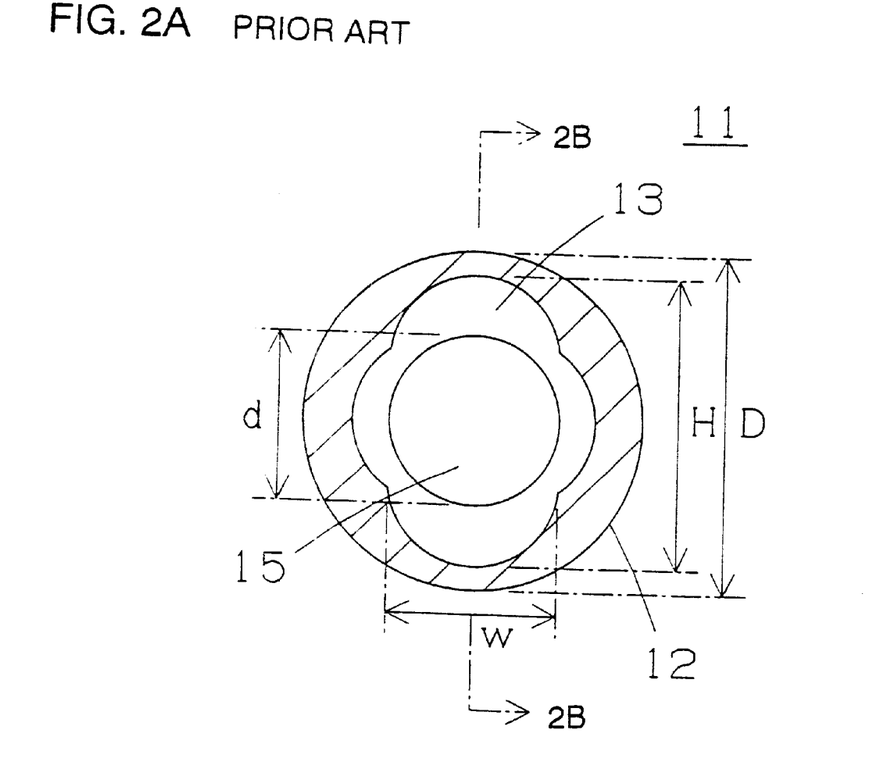
FIG. 2A is a plan view in cross section of the structure of the main portions of the conventional ultrasonic sensor.
Figure 2B:
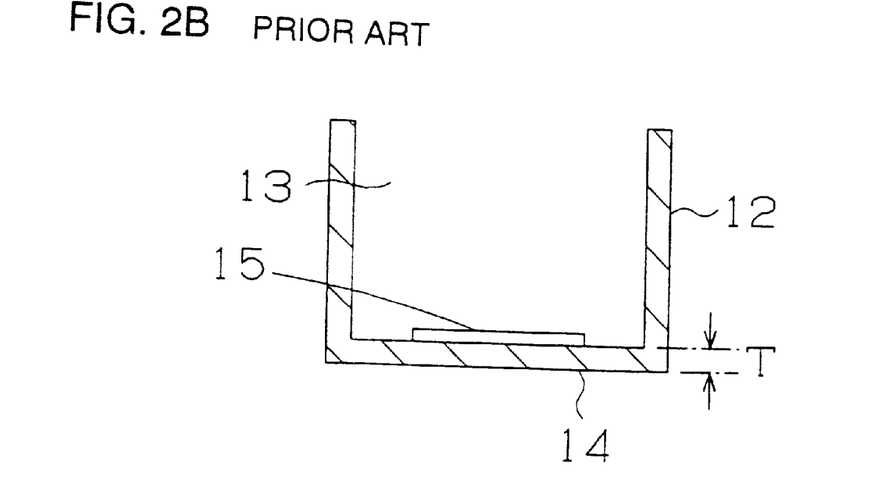
FIG. 2B is a sectional view taken along line 2B—2B of FIG. 2A.

To overcome the above-described problems, Japanese Laid-Open Patent Publication No. 9-284896 discloses a structure for controlling the directional properties without the use of ultrasonic horns. As shown in FIGS. 2A and 2B, an ultrasonic sensor 11 has a case member 12 in which an oblong or elliptical cylindrical hollow 13 is provided. A disk-shaped piezoelectric element 15 is affixed to a bottom portion 14 of the case member 12. When the case member 12 with such a structure is used, the ultrasonic energy spreads wider in the longitudinal direction of the oblong or elliptical cross section than in the transverse direction. Therefore, the ultrasonic radiation and detection range can be made wide in the horizontal direction and narrow in the vertical direction.

For example, when the ultrasonic sensor has an outside diameter D of 18 mm, the ultrasonic wave radiation and detection range becomes 80 degrees in the horizontal direction and 60 degrees in the vertical direction, thereby exhibiting an anisotropic radiation and detection range without using an ultrasonic horn.

However, when the ultrasonic sensor with the above-described structure is made small, the ultrasonic radiation and detection range in the vertical direction becomes wide, causing the difference between the ultrasonic radiation and detection range in the horizontal direction and that in the vertical direction to be small, so that the small ultrasonic sensor is not very anisotropic.

Figure 3:
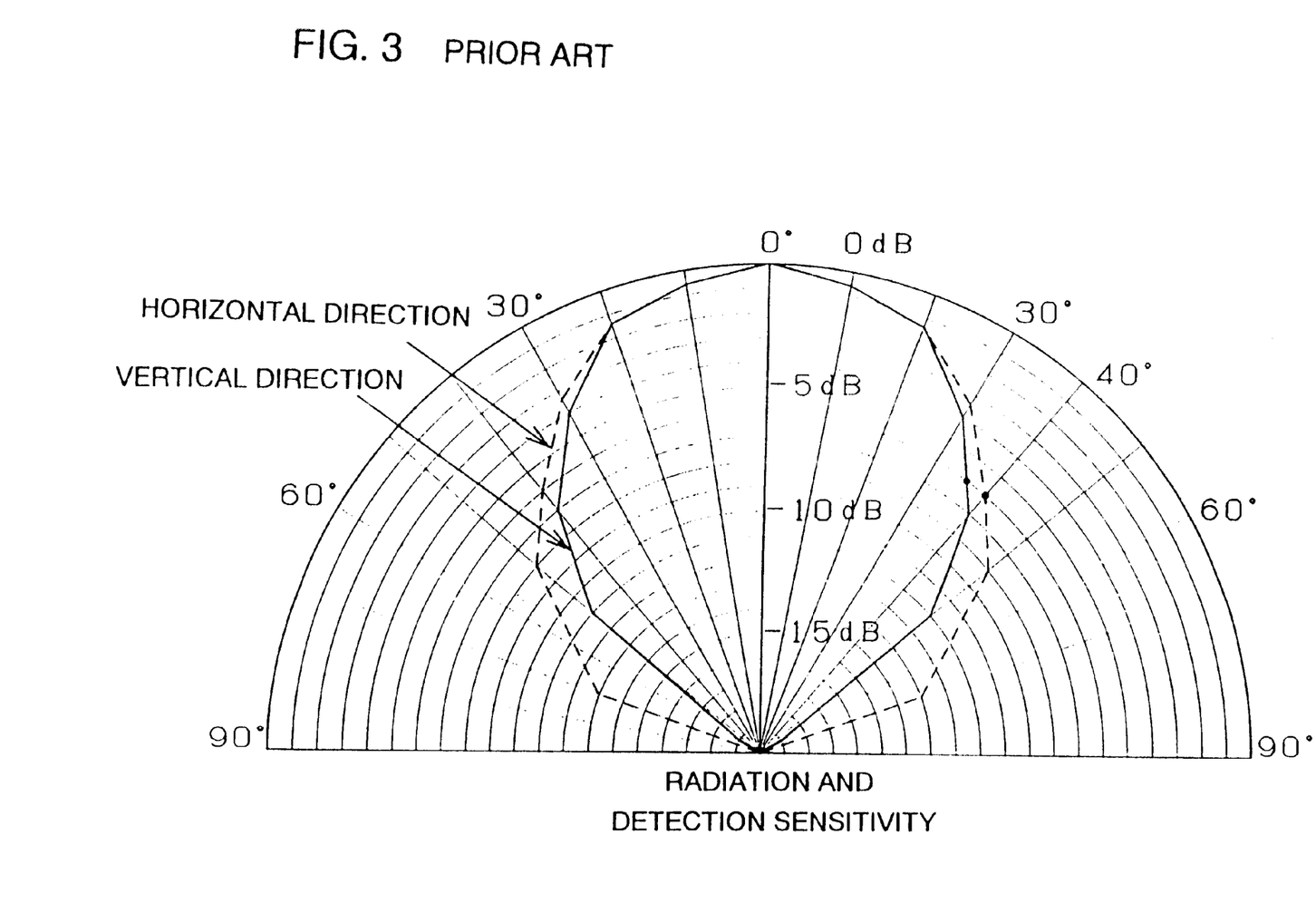
FIG. 3 illustrates the directional properties of the conventional ultrasonic sensor of FIG. 2.

In FIG. 2A, the vertically formed inside wall surfaces at the edges of the hollow 13 are made to extend in the longitudinal direction of the oblong such that each has an overall length H of 13 mm and a width W of 8 mm. The case member 12, in which the hollow 13 is formed, has an outside diameter D of 14 mm. The piezoelectric element 15, with a diameter d of 7 mm, is accommodated in the casing member 12, and affixed to the inside surface of the bottom portion 14. In FIG. 2B, the bottom portion 14 of the case member 12 has a uniform thickness T of 0.7 mm. The minimum thickness of each of the side walls of the case member 12 is 0.5 mm. The directional properties, in the horizontal and vertical directions, of such an ultrasonic sensor with the aforementioned dimensions are as shown in FIG. 3. FIG. 3 shows that the ultrasonic radiation and detection range (a half-decay angle) in the horizontal direction is 80 degrees, while that in the vertical direction is wide at 70 degrees. Therefore, the ultrasonic sensor with an outside diameter D of 14 mm is less anisotropic, in the horizontal and vertical directions, than the ultrasonic sensor with an outside diameter D of 18 mm. It is to be noted that the half-decay angle used to evaluate the ultrasonic radiation and detection range is the angle between directions in which the ultrasonic radiation and detection sensitivity is less than 20 log 0.5 dB (approximately 60 dB) of the radiation and detection sensitivity at the front face (or at the zero degree direction).

SUMMARY OF THE INVENTION

In view of the above-described problems, it is an object of the present invention to provide an ultrasonic sensor which has anisotropic radiation and detection characteristics with respect to the horizontal and vertical directions, even when the ultrasonic sensor is made small.

The ultrasonic sensor comprises a case member and an piezoelectric element. The case member has a hollow therein and a bottom portion provided at one end of the hollow. The bottom portion has a thick portion which extends along a first direction and a pair of thin portions which have a smaller thickness than the thick portion and are provided on opposite sides of the bottom portion along a second direction different than the first direction. The piezoelectric element radiates and/or detects ultrasonic energy and is provided at a center of the thick portion on an inner surface of the bottom portion.

The bottom portion may have a circular shape. Alternatively, the bottom portion may have an oblong or elliptical shape. In such a case, a longitudinal direction and a transverse direction of the oblong or elliptical shape preferably corresponds to the second direction and the first direction of the bottom portion, respectively.

The thin portions may have a thickness smaller than the thickness of a side wall surrounding the hollow. The outer surface of said bottom portion of said case member may be flat. Further, the ultrasonic sensor may comprise an insulating resin provided on the thin portions.

According to the present invention, the radiation and detection range of the ultrasonic sensor is made relatively narrower in the direction along which the thin portions of the bottom portion are provided due to the difference in the thicknesses between the thin portion and the thick portion. This is accomplished without the use of an ultrasonic horn, thereby providing an ultrasonic sensor having highly anisotropic radiation and detection characteristics between the horizontal direction and the vertical direction. This is true even when the ultrasonic sensor is made small.

Since the piezoelectric element is affixed to the thick portion rather than to the thin portion at the bottom portion of the case member, the ultrasonic sensor does not easily break when it is subjected to external shock. Consequently, the highly anisotropic ultrasonic sensor has increased shock resistance, allowing it to be put into practical use. In addition, the strength of the bottom surface of the case member can be maintained as a result of forming the thick portion, so that the thickness of the thin portion can be made small, thus allowing the ultrasonic sensor to be markedly anisotropic.

In the case where the bottom portion has an oblong or elliptical shape and where the thin portion is located in a longitudinal direction of the oblong or elliptical shape, the anisotropy of radiation and detection range can be further increased.

When an insulating resin is provided on the thin portion, it is possible to reduce the reverberation time of the ultrasonic sensor.

For the purpose of illustrating the invention, there is shown in the drawings several forms which are presently preferred, it being understood, however, that the invention is not limited to the precise arrangements and instrumentalities shown.

DETAILED DESCRIPTION OF THE INVENTION

Hereinafter, the preferred embodiments of the present invention are explained in detail with reference to the drawings.

Figure 4:
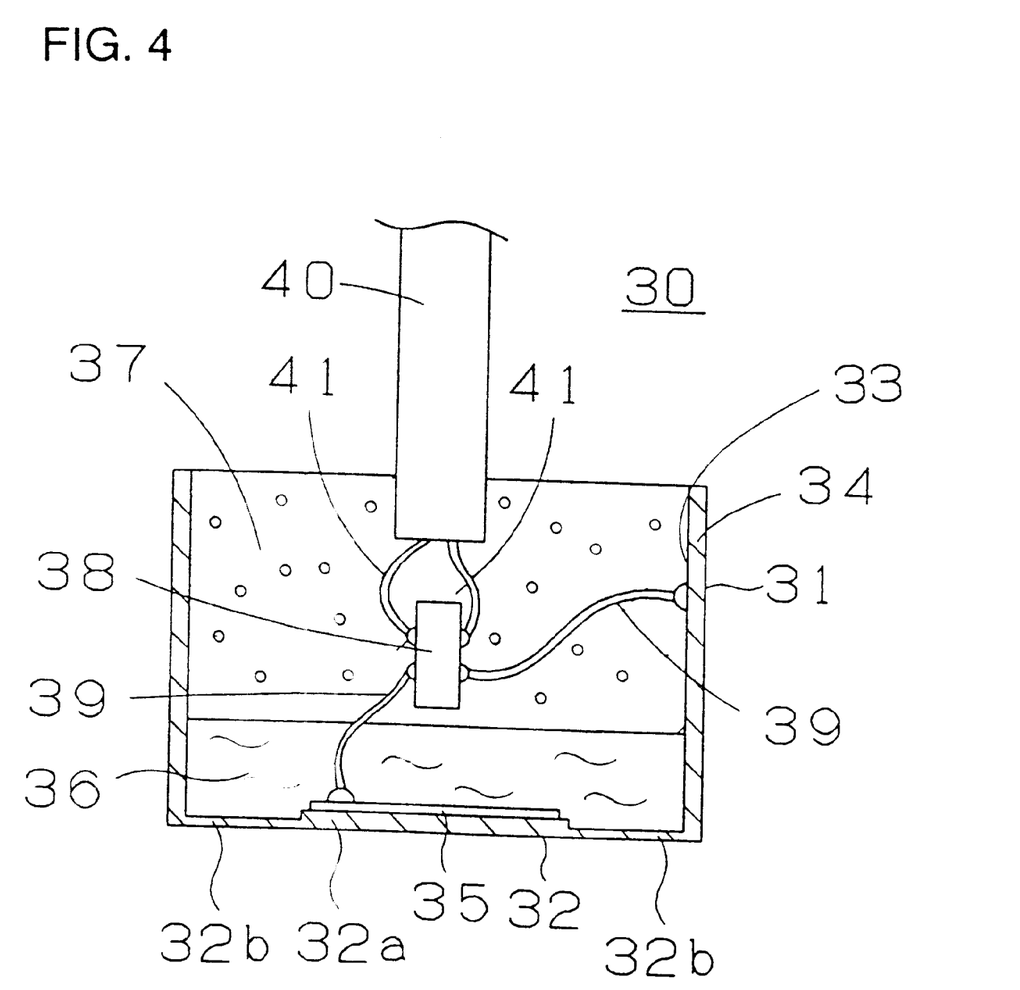
FIG. 4 is a sectional view of the structure of an embodiment of the ultrasonic sensor in accordance with the present invention.
Figure 5A:
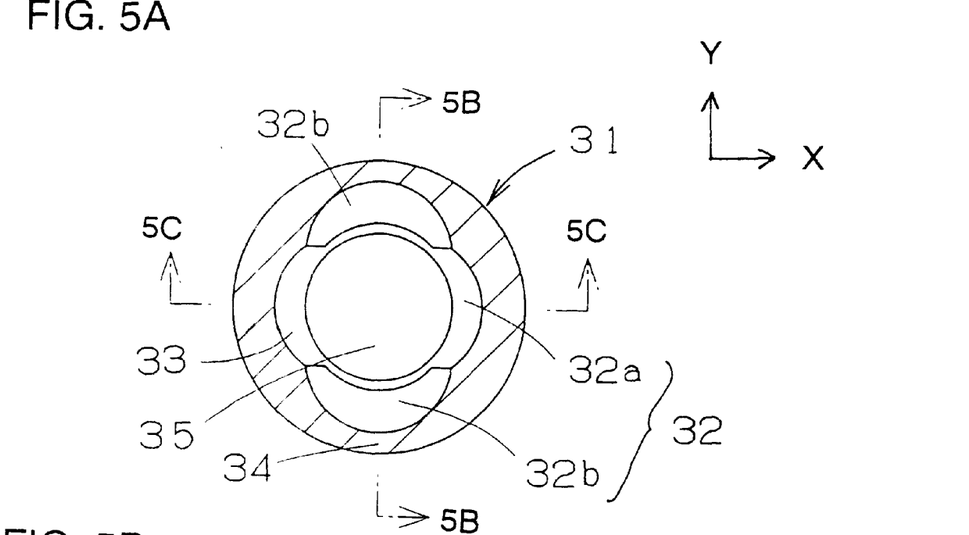
FIG. 5A is a plan view in cross section of the case member of the ultrasonic sensor.

As shown in FIG. 4 and FIGS. 5A to 5C, an ultrasonic sensor 30 according to a preferred embodiment of the present invention comprises a case member 31. The case member 31 has, for example, a circular cylindrical shape, and the entire case member 31 is made of a metallic material, such as aluminum. A hollow 33 is formed in the case member 31 along the extending direction of the case member 31. As shown in FIG. 5A, the hollow 33 has a general oblong or elliptical cross section including a longitudinal direction and a transverse direction at the bottom end thereof. For example, FIG. 5A shows that the length of the cross section along the y axis is longer than the length of the cross section along the x axis so that the longitudinal direction and the transverse direction of the cross section corresponds to the y axis and the x axis, respectively. The case member 31 comprises a bottom portion 32, and the bottom portion 32 has a circular outer surface corresponding to the outer shape of the cylindrical case member 31 and an oblong or elliptical inner surface corresponding to the shape of the hollow 33.

A piezoelectric element 35 is accommodated in the hollow 33 and affixed to the inner surface of the bottom portion 32. The piezoelectric element 35 is designed to vibrate so as to generate ultrasonic energy based on the applied electric signal and to detect the ultrasonic energy so as to generate a detection signal in accordance with the detected ultrasonic. The piezoelectric element 35 operates at the frequency of, for example, about 40 kHz.

The bottom portion 32 includes a thick portion 32a and thin portions 32b. The thick portion 32a is located at the center of the bottom portion 32 and extends in the transverse direction of the bottom portion 32. The thin portions 32b have a crescent shape, respectively and are located in the longitudinal direction of the bottom portion 32. The thin portion 32b has a thickness less than the thick portions 32a.

Figure 5B:
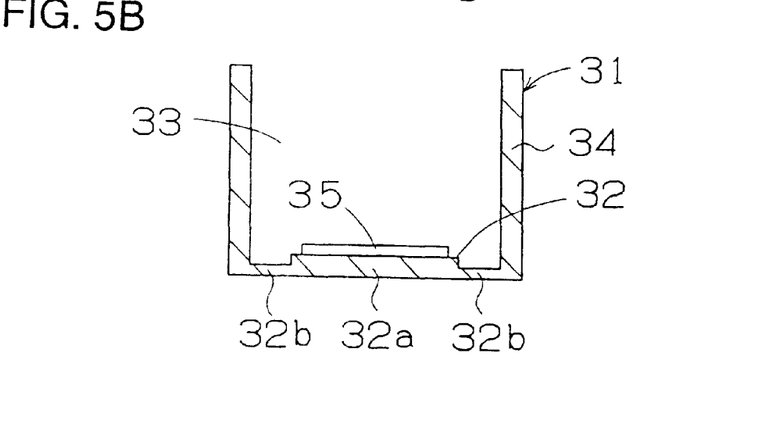
FIG. 5B is a sectional view taken along line 5B—5B of FIG. 5A (or a cross sectional view in the vertical direction).
Figure 5C:
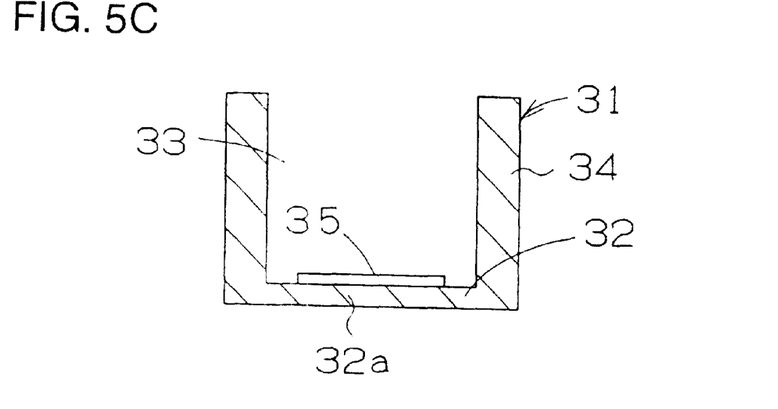
FIG. 5C is a sectional view taken along line 5C—5C of FIG. 5A (or a cross sectional view in the horizontal direction).

As shown in FIG. 4, using an electrically conductive adhesive or the like, one of the electrode surfaces of the piezoelectric element 35 is affixed to the inner surface of the thick portion 32a at the central portion of the bottom portion 32. Accordingly, as shown in FIG. 5B, the thin portions 32b are disposed on both sides of the thick portion 32a to which the piezoelectric element 35 is mounted. The thickness of the thick portion 32a is greater than the minimum thickness of the outer peripheral side wall 34 of the case member 31. The thickness of the thin portion 32b is less than the minimum thickness of the outer peripheral side wall 34 of the case member 31.

As shown in FIG. 4, a sound-absorbing material 36, such as felt, covers the piezoelectric element 35 in the ultrasonic sensor 30, and an insulating resin 37 having elastic properties, such as silicone rubber or urethane rubber, is filled in the case member 31 so as to seal the hollow 33. A temperature-compensating type capacitor 38 is embedded in the insulating resin 37. One of the external electrodes of the capacitor 38 is connected to the case member 31 that is in electrical conduction with one of the electrode surfaces of the piezoelectric element 35, through one of the lead wires 39, while the other of the external electrodes of the capacitor 38 is connected to the other of the electrode surfaces of the piezoelectric element 35, through the other of the lead wires 39. Two signal wires 41, for inputting and outputting signals, of a cable 40 is connected to each of the external electrodes of the capacitor 38.

The ultrasonic sensor 30 is used, for example, by being mounted to a vehicle. When the ultrasonic sensor 30 is installed on a vehicle, the longitudinal direction (y axis direction) of the hollow 33 is to be located in the direction substantially perpendicular to the road surface or the ground, while the transverse direction (x axis direction) is to be located substantially horizontal to the road surface. The bottom portion 32 of the case member 31 is generally perpendicular the direction of detection.

The ultrasonic sensor 30 having the above-described structure makes it possible to narrow the radiation and detection range in the vertical direction. Even when the ultrasonic sensor 30 is made small, the radiation and detection range in the vertical direction does not easily become wider, thereby allowing the radiation and detection range in the vertical direction to be kept narrow. Consequently, the difference between the radiation and detection range in the horizontal direction and that in the vertical direction is large, thereby greatly increasing the extent to which the ultrasonic sensor is anisotropic, even for a small ultrasonic sensor.

Figure 6:
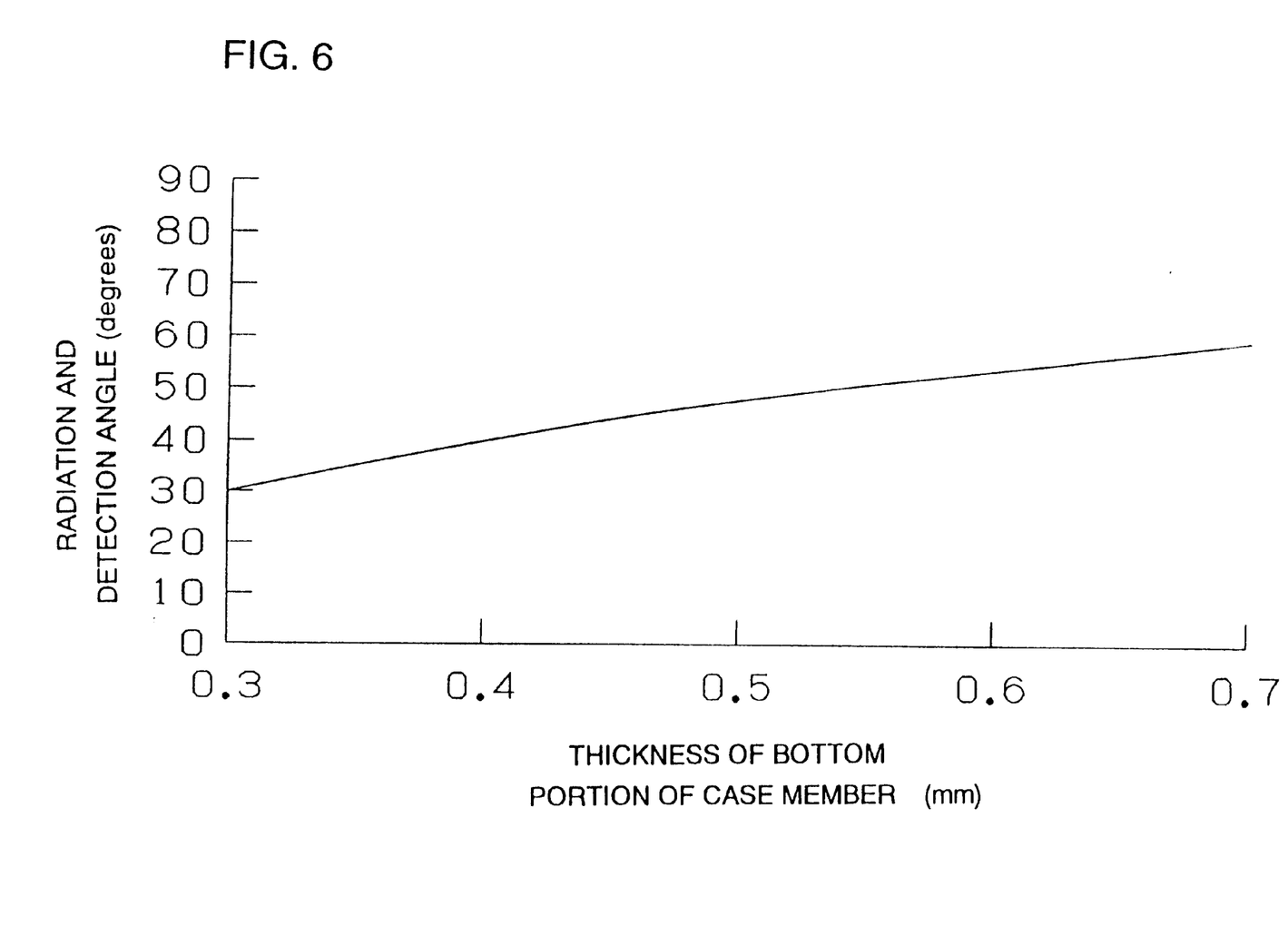
FIG. 6 is a graph showing the variations in the radiation and detection range angle in the vertically setting direction versus the thickness of the bottom portion of the case member, in the conventional ultrasonic sensor.

In order to narrow the radiation and detection range in the vertical direction for increasing the degree to which the ultrasonic sensor is anisotropic, the entire bottom portion of the case member of the ultrasonic sensor may be made thin, without forming a thick portion at the bottom portion of the case member 31. FIG. 6 and Table 1 show the variations in the radiation and detection angle in the vertical direction when the thickness of the bottom portion of the case member (which is uniform throughout the entire bottom portion) is decreased from 0.7 mm to 0.3 mm, for a conventional ultrasonic sensor with an outside diameter D of 18 mm.

| Thickness of Bottom Portion of Case Member (mm) | 30.3 | 0.4 | 0.5 | 0.6 | 0.7 |
|---|---|---|---|---|---|
| Transmission and Reception Range (°) | 30 | 40 | 48 | 54 | 60 |

Figure 7:
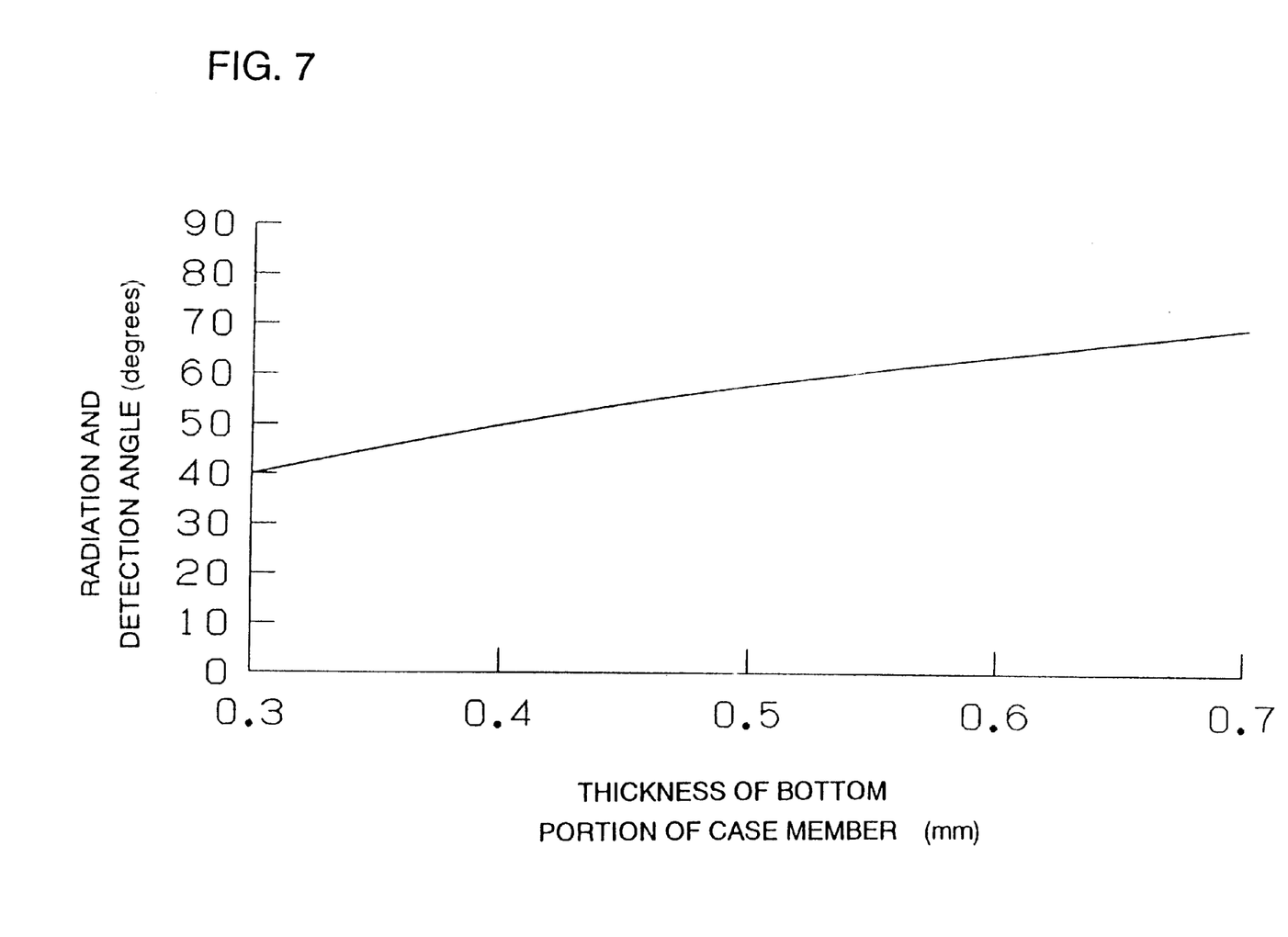
FIG. 7 is a graph showing the variations in the radiation and detection range angle in the vertically setting direction versus the thickness of the bottom portion of the case member, in a different conventional ultrasonic sensor.

FIG. 7 and Table 2 show the variations in the radiation and detection range angle in the vertical direction when the thickness of the bottom portion of the case member (which is uniform throughout the entire bottom portion) is decreased from 0.7 mm to 0.3 mm, another conventional ultrasonic sensor with an outside diameter D of 14 mm.

| Thickness of Bottom Portion of Case Member (mm) | 0.3 | 0.4 | 0.5 | 0.6 | 0.7 |
|---|---|---|---|---|---|
| Transmission and Reception Range (°) | 40 | 50 | 58 | 64 | 70 |

FIGS. 6 and 7, and Tables 1 and 2 show that the radiation and detection range can be made narrow by making the bottom portion of the case member thin, for both the ultrasonic sensor with an outside diameter of 18 mm and that with an outside diameter of 14 mm. The smaller the outside diameter of the ultrasonic sensor, the wider the radiation and detection range. For example, in the conventional ultrasonic sensor, when the thickness of the bottom portion is 0.7 mm, the radiation and detection ranges are 60 degrees and 70 degrees for an outside diameter of 18 mm and an outside diameter of 14 mm, respectively. When the thickness of the bottom portion is 0.3 mm, the radiation and detection ranges are 30 degrees and 40 degrees for an outside diameter of 18 mm and an outside diameter of 14 mm, respectively. In order to narrow the radiation and detection range in the vertically setting direction, all that is necessary is to make the bottom portion of the case member as thin as possible. However, when the entire bottom portion of the case member is formed into a thin portion, and the piezoelectric element is affixed to the thin portion, the piezoelectric element tends to be subjected to outside shock, and thus to break. Therefore, when the entire bottom portion of the case member is formed into a thin portion, it is, in practice, difficult to produce a small ultrasonic sensor which is highly anisotropic. In addition, when the shock resistance of the ultrasonic sensor is taken into account, there is a limit as to how thin the bottom portion of the case member can be made, so that the ultrasonic sensor cannot be made sufficiently anisotropic.

Figure 8:
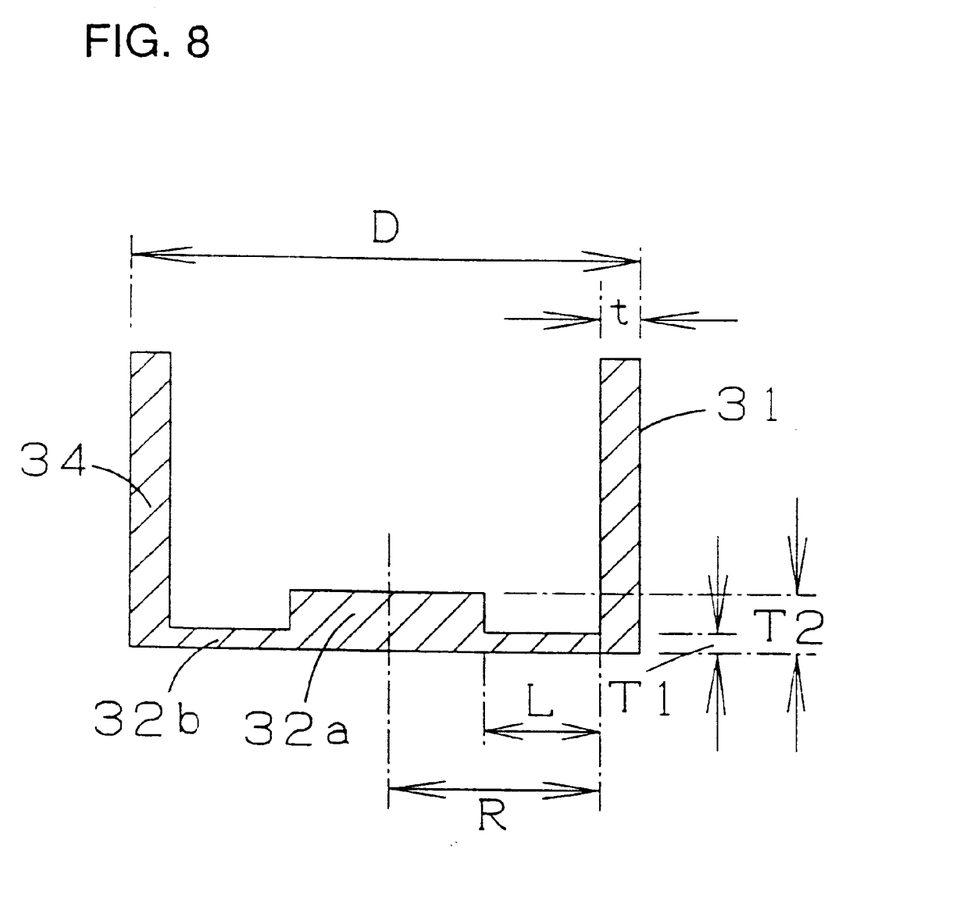
FIG. 8 is a sectional view of the case member of the ultrasonic sensor in accordance with the present invention, which is subjected to directional property measurement.

In contrast to this, according to the ultrasonic sensor 30 of the present invention, the bottom portion 32 is formed so as to have a thick portion 32a and a thin portion 32b, and the piezoelectric element 35 is affixed to the thick-walled portion 32a, so that the bottom portion 32 of the case member is not easily broken by the vibration of the piezoelectric element 35, thereby allowing the thickness of the thin-walled portion 32b to be made small. Therefore, it is possible to produce, in practice, an ultrasonic sensor 30 which has highly anisotropic radiation and detection properties between the horizontal direction and the vertical direction. In the ultrasonic sensor shown in FIG. 8, the outside diameter D of the case member 31 is 14 mm, the minimum thickness T of the outer peripheral wall 34 is 0.5 mm, the thickness T2 of the thick-walled portion 32a is 0.7 mm, and the thickness T1 of the thin-walled portion 32b is 0.3 mm. When the radius R of the bottom portion 32 is 6.5 mm, and the radius of the thick-walled portion 32a is (R−L) mm, where L is the length of the thin-walled portion 32b, the variations in the radiation and detection range versus the ratio of the length L of the thin-walled portion 32b to the radius R of the bottom portion 32, L/R, become as shown in FIG. 9 and Table 3.

| Ratio of Length L of Thin-Walled Portion to Radius R of Bottom Portion (L/R) | 0 | 0.1 | 0.2 | 0.3 | 0.4 |
|---|---|---|---|---|---|
| Transmission and Reception Range (°) | 70 | 65 | 60 | 55 | 48 |

Figure 9:
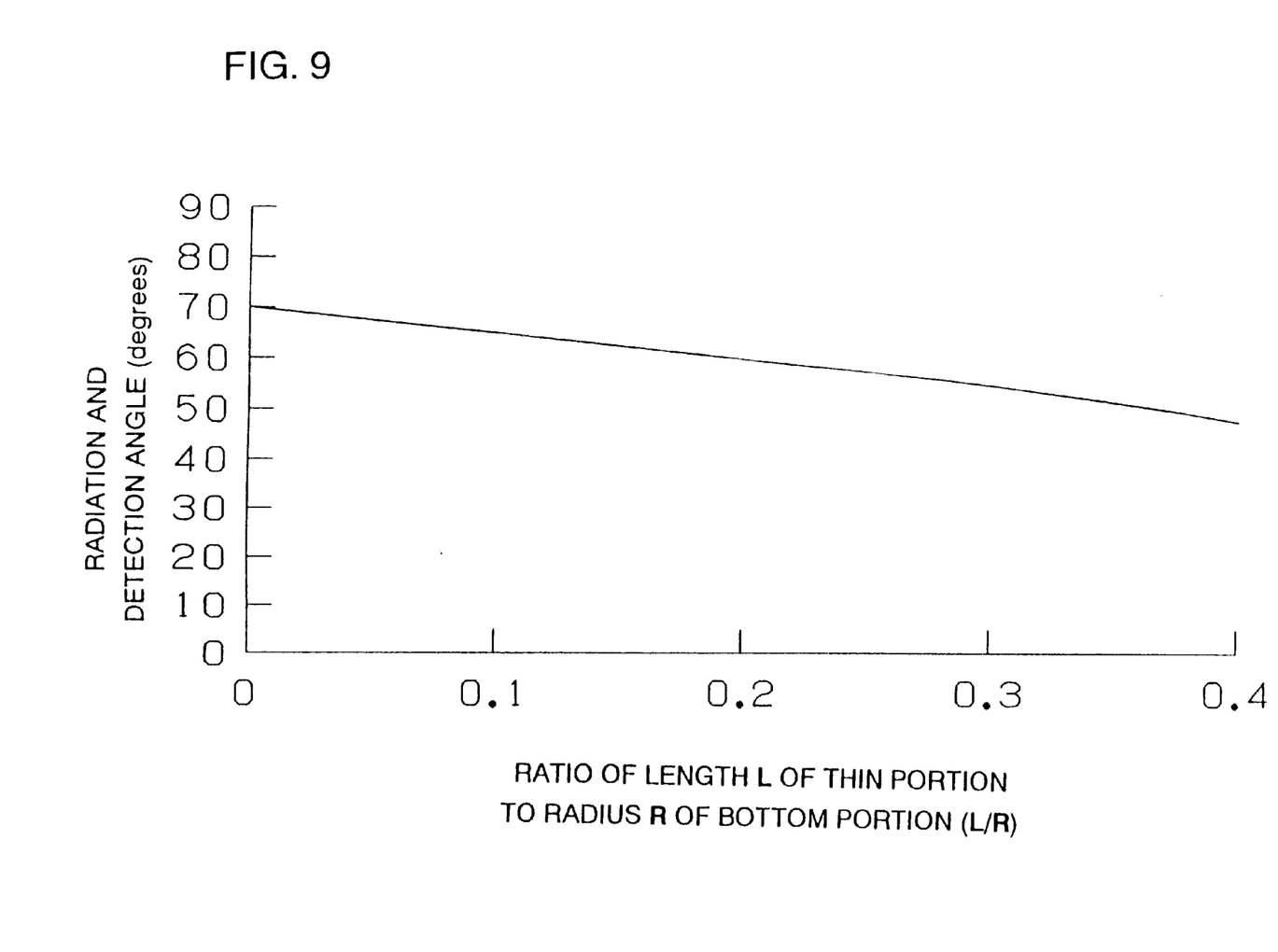
FIG. 9 is a graph showing the variations in the radiation and detection range angle when the L/R ratio is varied, in the aforemention ed ultrasonic sensor in accordance with the present invention.

FIG. 9 and Table 3 show that as the ratio L/R increases the radiation and detection range of the ultrasonic sensor 30 becomes narrower. Since the diameter of the piezoelectric element 35 is 0.7 mm, an L/R ratio range of from 0 to 0.4 allows the piezoelectric transducer 35 to be affixed to the thick portion 32a. In particular, when the L/R ratio is 0.4, a radiation and detection ratio close to that obtained when the entire bottom portion 32 is formed into a thin portion 32b can be obtained.

Figure 10:
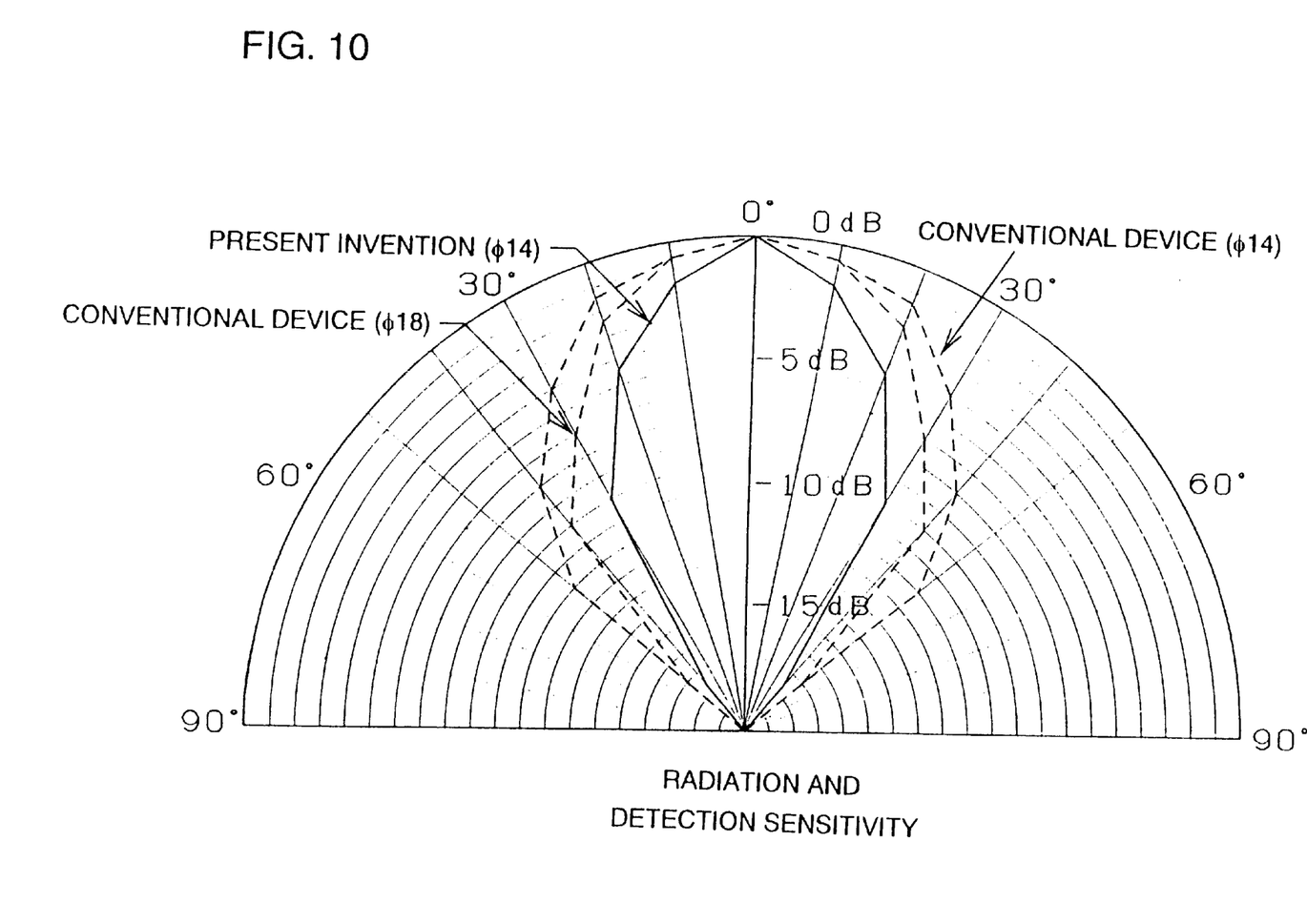
FIG. 10 shows a comparison between the directional properties of the conventional ultrasonic sensor and that of the ultrasonic sensor in accordance with the present invention.

FIG. 10 shows a comparison between the directional properties of the conventional ultrasonic sensor and that of the ultrasonic sensor 30 of the present invention. More specifically, it shows the radiation and detection range of the conventional ultrasonic sensor with a diameter of 18 mm (whose bottom portion is 0.7 mm thick), in the vertical direction; the radiation and detection range of the conventional ultrasonic sensor with a diameter of 14 mm (whose bottom portion is 0.7 mm thick), in the vertical direction; and the radiation and detection range of the ultrasonic sensor 30 of the present invention with an L/R ratio of approximately 0.4. It can be seen from FIG. 10 that according to the present invention a radiation and detection range narrower than that of the conventional ultrasonic sensor with a diameter of 18 mm can be achieved even when the ultrasonic sensor 30 has a diameter of 14 mm.

Figure 11:
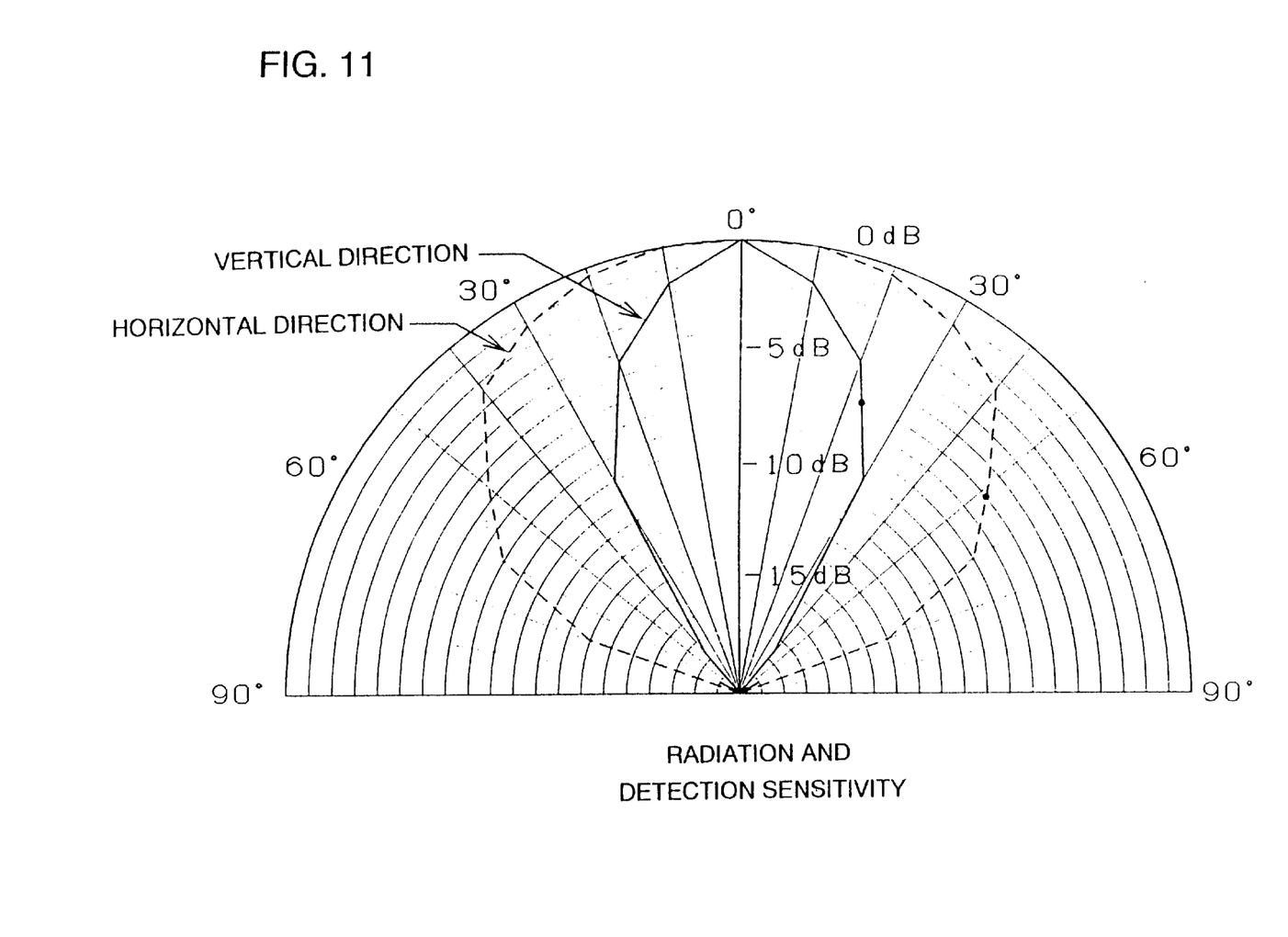
FIG. 11 shows a comparison between the directional properties of the ultrasonic sensor in accordance with the present invention, in the horizontally setting direction and the vertically setting direction.

FIG. 11 illustrates the directional properties in the horizontal direction and the vertical direction of the ultrasonic sensor 30 using the case member 31 of FIG. 5. Here, the diameter of the ultrasonic sensor 30 is 14 mm, the thickness of the thick portion 32a is 0.75 mm, the thickness of the thin portion 32b is 0.3 mm, and L/R=2.5 mm/6.5 mm=0.38. It can be seen that the ultrasonic sensor 30 is fairly highly anisotropic in the direction of the radiation and detection range.

Figure 12:
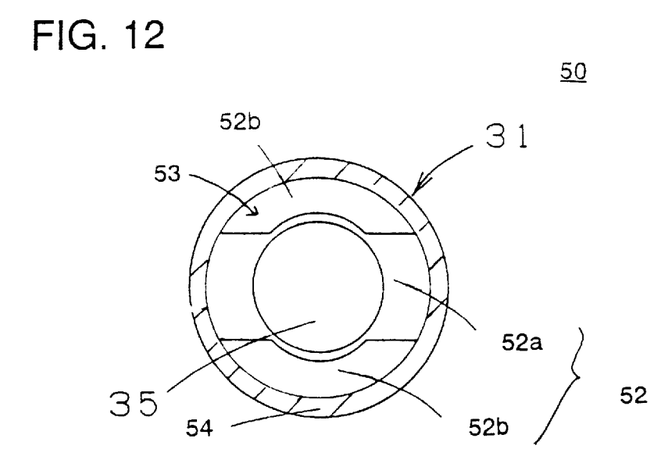
FIG. 12 is a plan view in cross section of the case member of an ultrasonic sensor according to another embodiment of the present invention.

The ultrasonic sensor 30 may be modified in various ways. Although, in the ultrasonic sensor 30 explained in accordance with the preferred embodiment, the hollow 33 has an oblong or elliptical cross section at the bottom end, the hollow may have a circular cross section. As shown in FIG. 12, an ultrasonic sensor 50 according to another embodiment includes case member 51 in which a hollow 53 having a circular cross section is provided. A bottom portion 52 of the case member 51 includes a thick portion 52a and thin portions 52b, and the thick portion 52a is located at the center of the bottom portion 52 and extends in a first direction while the thin portions 52b are provided on the opposite sides of the thick portion 52a in the direction perpendicular to the first direction. A side-wall 54 of the case member 51 has a uniform thickness around the entire periphery of the bottom portion 52. It is to be noted that a sound-absorbing material, an insulating resin, lead wires or the like which are shown in FIG. 4 are not shown in FIG. 12 for clarity. According to the structure, the case member 31 can be produced easily or at low cost as the hollow 33 is a simple circular shape. Nevertheless, the ultrasonic sensor 30 secures the anisotropic radiation and detection range due to the thin portions 52b.

Figure 13A:
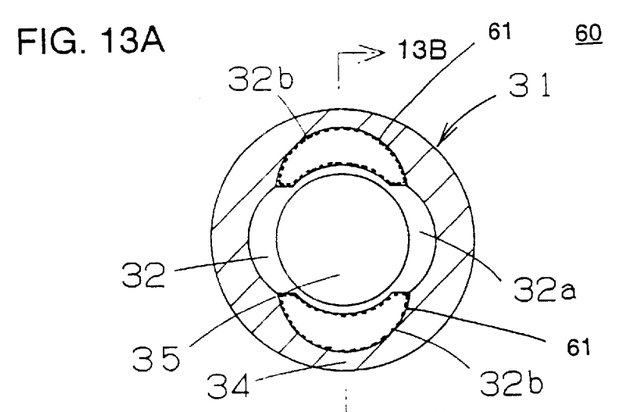
FIG. 13A is a plan view in cross section of the case member of an ultrasonic sensor according to still another embodiment of the present invention.
Figure 13B:
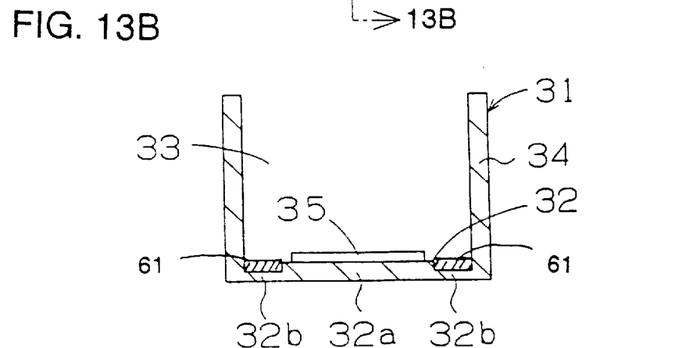
FIG. 13B is a sectional view taken along line 13B—13B of FIG. 13A (or a cross sectional view in the vertical direction).

FIGS. 13A and 13B shows an ultrasonic sensor 60 according to still another embodiment of the present invention. The ultrasonic sensor 60 is identical to the ultrasonic sensor 30 except that the ultrasonic sensor 60 further comprises an insulating resin 61 on the thin portions 32b. The insulating resin 61 is made of a material such as silicon resin or urethane resin and attenuates an unwanted vibration of the thin portions 32b. The unwanted vibration of the thin portion 32b likely increases a reverberation of the ultrasonic sensor 60, which causes the problem that the ultrasonic sensor 60 cannot detect the existence of the object very close to the ultrasonic sensor 60 or cannot measure a very short distance to the close object as the reverberation of the ultrasonic sensor 60 interfere with the ultrasonic energy reflected by the close object.

Figure 14:
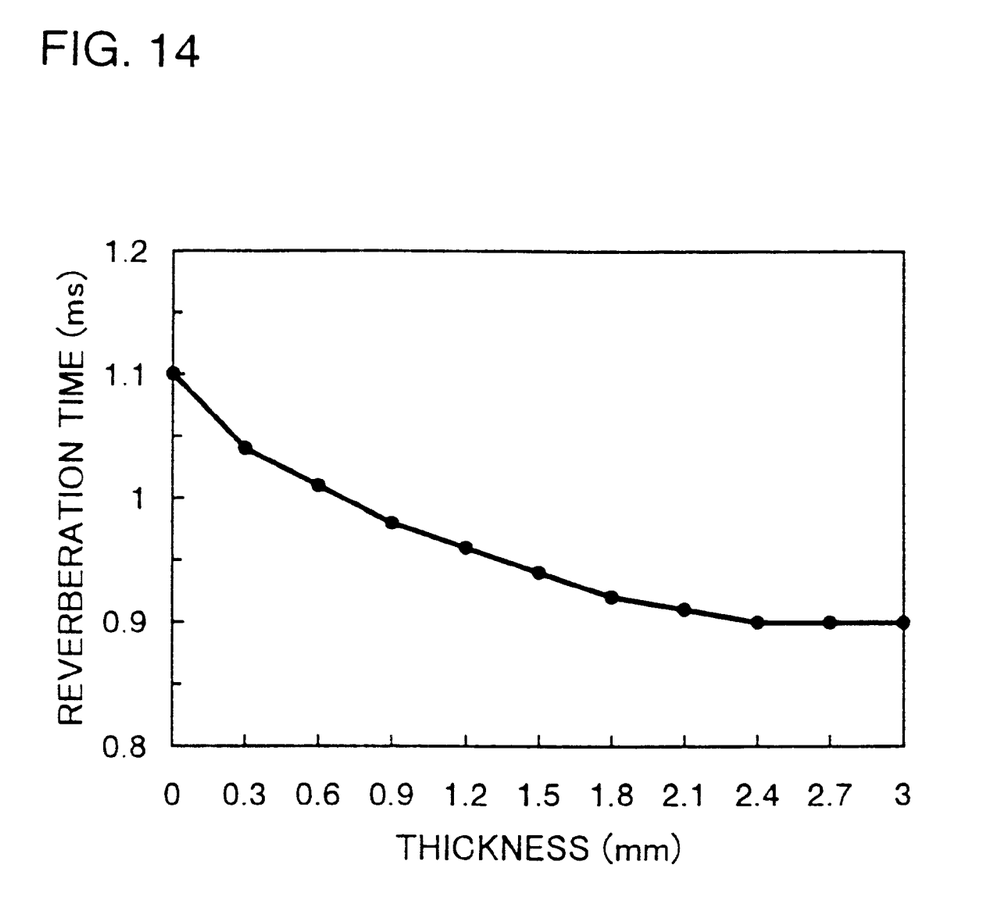
FIG. 14 is a graph showing a relationship between reverberation time and the thickness of the insulating resin.

According to the ultrasonic sensor 60, the insulating resin 61 on the thin portion 32b of the bottom portion 32 of the case member 31 effectively decreases the reverberation time. As shown in FIG. 14, the reverberation time is decreased in accordance with increase of the thickness of the insulating resin 61. Thus, the insulating resin 61 has a sufficient thickness such that the reverberation time is made limited to a value determined by required characteristics for the intended purpose of the ultrasonic sensor 60. As a practical matter, it is preferable that the reverberation time is made equal to 1 ms or less. Thus, the thickness of the insulating resin 61 is preferably about 0.9 mm or greater. When the insulating resin 61 is too thick, the vibration of the bottom portion 32 is adversely attenuated during the radiating ultrasonic energy. Therefore, the thickness of the insulating resin 61 is preferably less than about 2.1 mm.

Although in the present embodiment the boundary between the thick portion and the thin portion is step-like in form, it may be formed into a smooth slope. However, it is preferable that the outer surface of the case member be formed into a plane surface so that the radiation and detection property of the ultrasonic sensor is not lost.

It is also noted that, although the ultrasonic sensor of the present invention is explained as a dual use device for radiating and detecting ultrasonic energy the ultrasonic sensor of the present invention may be used as only either an ultrasonic radiation device or an ultrasonic detection device. In the case, the ultrasonic sensor of the present invention acts as a ultrasonic radiation device having an anisotropic radiation range or a ultrasonic detection device having an anisotropic detection range.

While preferred embodiments of the invention have been disclosed, various modes of carrying out the principles disclosed herein are contemplated as being within the scope of the following claims. Therefore, it is understood that the scope of the invention is not to be limited except as otherwise set forth in the claims.

What is claimed is:

1. An ultrasonic sensor, comprising:
   a case member having a hollow therein and a bottom portion provided at one end of the hollow, the bottom portion having a thick portion which extends along a first direction and apair ofthin portions which have a smaller thickness than the thick portion and are provided on opposite sides of the bottom portion along a second direction different than said first direction; and a piezoelectric element for radiating and/or detecting ultrasonic energy, the piezoelectric element provided at a center of the thick portion on an inner surface of the bottom portion.

2. An ultrasonic sensor according to claim 1, wherein the bottom portion has a circular shape.

3. An ultrasonic sensor according to claim 1, wherein the bottom portion has an oblong or elliptical shape.

4. An ultrasonic sensor according to claim 3, wherein a longitudinal direction and a transverse direction of the oblong or elliptical shape corresponds to the second direction and the first direction of the bottom portion, respectively.

5. An ultrasonic sensor according to claim 1, wherein the case member comprises a side wall surrounding the hollow, and the thin portions have a thickness smaller than the thickness of the side wall.

6. An ultrasonic sensor according to claim 1, wherein the outer surface of said bottom portion of said case member is flat.

7. An ultrasonic sensor, comprising:

a case member having a hollow therein and a bottom portion provided at one end of the hollow, the bottom portion having a thick portion which extends along a first direction and a pair of thin portions which have a smaller thickness than the thick portion and are provided on opposite sides of the bottom portion along a second direction different than said first direction;

a piezoelectric element for radiating and/or detecting ultrasonic energy, the piezoelectric element provided at a center of the thick portion on an inner surface of the bottom portion; and an insulating resin provided on the thin portions.

8. An ultrasonic sensor according to claim 1, wherein the first and second directions are orthogonal to one another.

* * * * *